US007214413B2

(12) United States Patent
Koulik et al.

(10) Patent No.: US 7,214,413 B2
(45) Date of Patent: May 8, 2007

(54) METHOD AND DEVICE FOR GENERATING AN ACTIVATED GAS CURTAIN FOR SURFACE TREATMENT

(75) Inventors: Pavel Koulik, Blaesheim (FR); Mikhaïl Samsonov, Illkirch-Graffenstaden (FR); Zorina Evguenia, Blaesheim (FR)

(73) Assignee: APIT Corp. S.A., Sion (CH)

(*) Notice: Subject to any disclaimer, the term of this patent is extended or adjusted under 35 U.S.C. 154(b) by 783 days.

(21) Appl. No.: 10/474,669

(22) PCT Filed: May 3, 2002

(86) PCT No.: PCT/IB02/01482

§ 371 (c)(1),
(2), (4) Date: Oct. 14, 2003

(87) PCT Pub. No.: WO02/091809

PCT Pub. Date: Nov. 14, 2002

(65) Prior Publication Data

US 2004/0115872 A1 Jun. 17, 2004

(30) Foreign Application Priority Data

May 3, 2001 (EP) ................................ 018104433

(51) Int. Cl.

| | |
|---|---|
| ***B05D 3/14*** | (2006.01) |
| ***H05H 1/32*** | (2006.01) |
| ***B23K 9/073*** | (2006.01) |
| ***B23K 9/18*** | (2006.01) |

(52) U.S. Cl. ................. 427/562; 427/569; 219/121.47; 219/76.16; 219/121.54

(58) Field of Classification Search ..................... None
See application file for complete search history.

(56) References Cited

U.S. PATENT DOCUMENTS 3,786,306 A 1/1974 Schoumaker (Continued)

FOREIGN PATENT DOCUMENTS

WO WO 9946964 A 9/1999

OTHER PUBLICATIONS

Koulik et al., Atmospheric Plasma Sterilization and Deodorization of Dielectric Surfaces, Jun. 1999, Plasma Chemistry and Plasma Processing, vol. 19 No. 2, pp. 311-326.*

*Primary Examiner*—William Phillip Fletcher, III
*Assistant Examiner*—Cachet I. Sellman
(74) *Attorney, Agent, or Firm*—Clifford W. Browning; Krieg DeVault LLP

(57) ABSTRACT

The invention relates to a surface treatment device comprising: electrodes (24a, 24b) that are used to initiate an electric arc of stabilised plasma (14); a stabilising channel (12) which is disposed in a body (10) in order to confine the electric arc of stabilised plasma; conduits (38, 39) which are disposed in the body and used to introduce a treatment gas $Q_1$, uniformly distributed along the arc, upstream of the arc in a direction that is essentially perpendicular to axis A of said arc in such a way as to form an activated gas curtain (8); means for introducing a complementary treatment gas $Q_2$ downstream of the electric arc; and a support (28) that is used to hold the object or material to be treated in place and to position the object or material surface to be treated in relation to the body (10).

25 Claims, 3 Drawing Sheets

Figure 1:
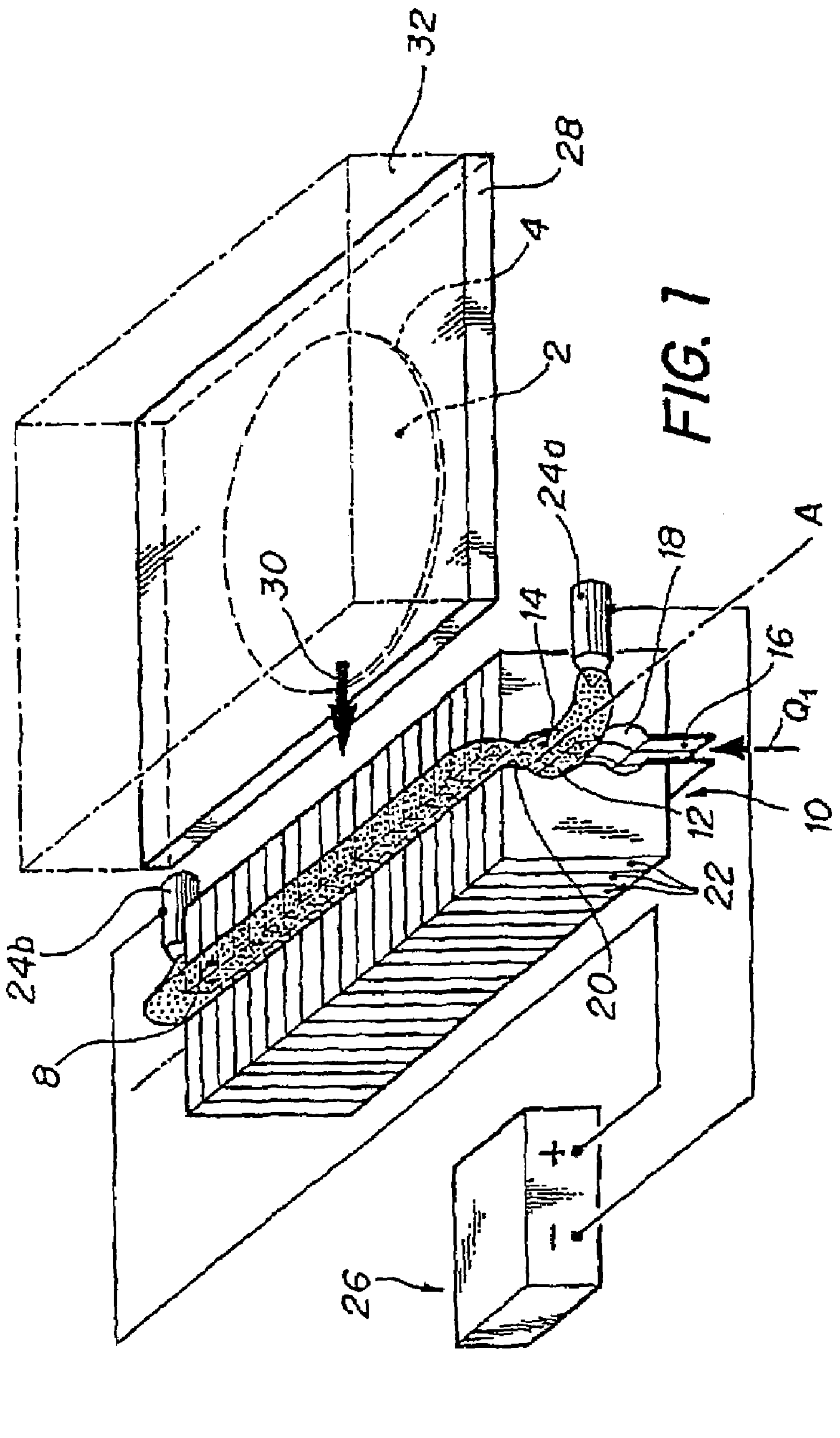

U.S. PATENT DOCUMENTS 4,335,160 A * 6/1982 Neary et al. ................ 427/492
4,936,940 A * 6/1990 Kawasumi et al. ...... 156/345.5
5,284,544 A * 2/1994 Mizutani et al. ....... 156/345.38
6,372,298 B1 * 4/2002 Marantz et al. ............. 427/449
6,423,924 B1 * 7/2002 Goloviatinskii et al. ..................... 219/121.59

* cited by examiner 4
42
30
8
40
14
38
18
Q1
Q2
20
A
10
12
L

METHOD AND DEVICE FOR GENERATING AN ACTIVATED GAS CURTAIN FOR SURFACE TREATMENT

The present invention relates to a method for generating a curtain of an activated gas, by means of an electric discharge, for the treatment of surfaces of conductive, semiconductive or dielectric materials, as well as a device for carrying out the method.

The surface treatments, which can be carried out, include, amongst others, the sterilisation, the stripping, the deposition of films or the activation of particles on the surface of the material.

Methods for treating surfaces at ambient pressure are known, in which plasma streams are used, which are formed by one or several plasma jets having a cross-section either circular (for example, from a Plasmatron with an internal arc), elliptic (for example, from a Plasmatron with two jets), annular (for example, from a Plasmatron with a rotating arc) or further shaped as a rake or as a curtain (for example, from a series of Plasmatrons with one or two jets each).

The treatment of large surfaces, by means of a plasma stream, having a circular, an elliptic or an annular cross-section is carried out conventionally by scanning the surface along two directions. The treatment of large surfaces by means of a conventional rake-shaped or a curtain shaped stream of plasma makes it possible to scan the surface along several directions, provided the length of the rake or of the curtain is greater than the width of the surface to be treated.

A disadvantage of the scanning devices operating along two directions, is that a re-deposition effect of residues takes place on the peripheral part of the surface to be treated, because of some migration of residual products, such as micro-organisms, oil and grease remnants and photoresist products into the zones neighbouring those treated. Furthermore, the uncontrolled and repeated heating of the peripheral zones and the passage of the surface to be treated under a non conditioned plasma can cause either an annealing of the material, or a treatment which is partial, or even incomplete physicochemical transformations of the surface to be treated. These disadvantages are also experienced in methods in which a scanning is carried out by rotation and which, owing to different linear scanning speeds at different diameters, have the additional disadvantage of producing locally different treatment durations. One can achieve a uniform treatment only statistically, by scanning repeatedly the same zone, which excludes a precise surface treatment of the material.

The use of devices producing a plasma having the shape of a rake or of a curtain of plasma is highly desirable in practice, because the whole surface can be treated in one pass. The effects of redeposition are thus strongly reduced. However, problems of annealing and of partial treatment or of incomplete physicochemical transformation of the material persist, since it is difficult to ensure that the parameters of the plasma remain rigorously uniform over the whole length of the rake or of the plasma curtain. The zones where the different plasma jets overlap have properties, which are different from those of the axial zones of the jets. One can partly remedy these problems by using powerful magnetic fields, which induce an oscillation of the jets.

Another problem of the conventional devices is that a certain amount of the metal vapours generated at the electrodes is present in the plasma jet and contaminates the surface being treated. Most applications do not tolerate the presence of extraneous metal in the plasma exceeding 0.0001 to 0.001%. This is the case, for instance, of applications in the field of electronics, of equipment designed for use in the space or of catalytic devices. Conventional means for reducing the metal vapours include optimising the material of the electrodes and the generating gas, decreasing the current and increasing the discharge voltage or condensing the metal vapours on the walls.

The most effective means for excluding extraneous metal are those used in the plasma generators designed for the spectroscopic analysis of materials. Special measures are taken, such as the elimination of metal vapours by a thermal or by an electromagnetic pinch effect and the use of discharge regimens without cathodic or anodic spots. Such solutions are available in the Plasmatrons used for the determination of the composition of natural minerals, which include means for generating a spectrally pure plasma, in which the concentration of metal vapours is too low to be detected by known spectrographic methods. However, it is impossible to use this type of Plasmatron for obtaining a stream of plasma, which is uniform over a large surface.

The use of an electric arc, generated in a cylindrical chamber by two electrode jets, directed one against the other, is known. A longitudinal slot is provided in the cylindrical housing. The plasma stream exiting from the chamber through the slot is used for different treatments, such as the coating of parts with molten powders. In such a device, if some problems associated with the generation of a stream of plasma having the shape of a curtain are avoided, the use of plasma jets directed one against the other does not make it possible to guarantee a flow of plasma which is uniform over the whole length of the slot. The lack of uniformity of the plasma is due not only to hydrodynamic effects, but also to helicoidal instabilities of an electrodynamic nature, resulting from the lack of stabilisation of the plasma. Furthermore, the plasma contains unavoidably extraneous metal generated at the electrodes. All these effects make this known method unpractical for those treatments which need to be precise, in particular in the field of electronics.

A method and a device for generating a uniform plasma string, such as described in the patent application WO 99/46964 or such as proposed and used for the sterilisation of surfaces (see P. Koulik, S. Krapivina, A. Saïtchenko, M. Samsonov, Vide N° 299, volume 1/4, 2001, p. 117) rely on the generation of a plasma which is in a state of thermodynamic equilibrium in a dielectric channel defined, on the one hand, by a plurality of diaphragms which are isolated from one another and in which a passage is provided having the shape of a channel and, on the other hand, by the surface to be treated. It is important to stress that the surface to be treated contributes per se to the stabilisation of the arc. When the stabilising channel thus formed is cylindrical, the treatment along the axis of the stabilised channel is in theory strictly uniform. The treatment of a large surface is carried out by scanning. In this case, the treatment of the entire surface is in theory uniform.

However, the above-mentioned method suffers two disadvantages. The first one is that only dielectric surfaces can be treated. In view of the fact that the plasma is longitudinally under tension, experience shows that a part of the current traverses the body to be treated when the same is slightly conductive (for example, a silicon wafer). This results in an alteration of the surface to be treated, for example the formation of minute craters, from minute electric breakdowns in zones where the difference in the potential between the plasma and the body to be treated is the greatest. The second disadvantage is that the surface of the body to be treated is part of the stabilising channel and, for this reason, the smallest irregularity of the surface to be treated or the slightest variation in the cross-section of the stabilising channel, in particular during the scanning motion, or the slightest instability over time, cause a variation in the current and hence of all the plasma parameters. Accordingly, this system is unstable and it is virtually impossible to achieve under such conditions a surface treatment which is uniform.

In view of the above-mentioned disadvantages, an objective of the invention is to provide a surface treatment method which enables an effective and a uniform treatment of large surfaces to be treated, as well as a device for carrying out the method.

Advantageously, the invention provides a surface treatment method and a device for carrying out the method which are versatile, in particular which make it possible to carry out different treatments of surfaces such as sterilisation, stripping, film deposition or surface activation and which make it possible to treat different materials such as dielectric materials, semi-conductive materials, conductive materials, whether liquid or solid. Advantageously, the invention also provides a surface treatment method which can be used for the formation of a powder.

Advantageously, the invention provides a surface treatment method and a device for carrying out the method, which make it possible to avoid the deposition of undesirable chemical components, such as metal vapours originating from the electrodes.

The objectives of the invention are achieved by a surface treatment method according to claim 1 and a device for carrying out the method according to claim 11.

In the present invention, a method for the treatment of surfaces or for the formation of powders on a surface includes initiating an electric arc of stabilised plasma, generating a jet of an activated gas in the form of a curtain from said electric arc substantially perpendicularly to the axis A of said electric arc and projecting the curtain of activated gas on the surface to be treated, characterised in that the distance L of the axis A of the electric arc from the surface to be treated, as well as the speed v of the stream of activated gas are adjusted in such a manner that the particles of the curtain of activated gas be electrically neutral and in a metastable state at the point of time when they come in contact with the surface to be treated.

In particular, the distance L of the electrical axis from the surface to be treated and the speed v of the stream of activated gas are adjusted in such a manner as to satisfy the relation $L/v>\tau$, in which $\tau$ is the relaxation time of the metastable states of the particles.

In the method according to the invention, the parameters of the stream of activated gas and the scanning speed are adjusted so as to satisfy the following requirement: the diffusion length D of the activated molecules, radicals and atoms contained in the curtain of activated gas must exceed the thickness $\delta$ of the boundary layer separating the impinging activated gas from the surface to be treated. In practice, taking into account the complexity of the calculation of the boundary layer, the above-cited requirement is satisfied empirically through tests, by recording various parameters of the method, such as the speed, the density and the temperature of the stream of activated gas and of the stream of gas dragged along by the surface to be treated.

In order to create a curtain formed of particles which are electrically neutral and in a metastable state, one of the techniques according to the invention consists in adjusting the speed of the gas forming the curtain of activated gas, so that the same exceeds the ratio of the distance of the central axis of the electric arc from the surface to be treated, to the relaxation time of the particles forming said curtain of activated gas.

By generating a curtain of activated gas having reduced transverse dimensions, the present invention makes it possible to create important gradients of temperature and of concentration of the components of the activated gas on the surface to be treated. In this manner, the method according to the invention ensures an access to the surface to be treated by diffusion not only of excited molecules and radicals, but also of excited atoms, which broadens considerably the field of application of the method according to the invention, in particular in electronics.

The stabilised electric arc is generated by a device including diaphragms which are isolated from one another and which form a channel with a complex cross-section (cylindrical, square, rectangular, triangular and others) having one or more inlets for the introduction, substantially perpendicularly with respect to the axis of this arc, of a stream of treatment gas, uniformly along the axis of the arc. By treatment gas, is meant here a gas fed for creating and maintaining the electric arc of plasma, as well as for generating activated particles and, when appropriate, a reactive gas for forming a film coating or for undergoing some other chemical reaction with the surface to be treated. This treatment gas is activated at its contact with the stabilised arc and it exits from the channel via an outlet passage, which can be provided in the form of a slot running parallel to the axis of the arc, in such a manner that the resulting stream forms a curtain of activated gas. The gas or the mixture of gases constituting the treatment gas, the speed of the stream of activated gas, the distance of the axis of the electric arc from the surface to be treated, as well as the scanning speed of the surface to be treated are selected and controlled to ensure that the activated gas is thermodynamically in a state of non equilibrium or, otherwise said, in a so-called metastable state, while being uniform in a direction running parallel to the electric arc which caused its activation. This curtain of activated gas is then projected on the surface to be treated, the relative scanning motion making possible a uniform treatment of the entire surface to be treated. Depending on the nature of the gases which are introduced, it is possible to carry out different surface treatments, such as stripping, cleaning, sterilising and depositing films, or forming powders on the surface of a support.

Since the activated gas forming the curtain does not contain particles which are electrically charged and, accordingly, is not electrically conductive, there is no interference between the surface being treated and the stabilised arc. The treatment is thus stable and independent of the state, of the properties (in particular dielectric), of the motion and of the position of the surface being treated.

Said curtain of activated gas can be created at pressures beneath (under vacuum) or above ambient pressure. However, optimal use is at ambient pressure.

An important characteristic of the present invention, is that the stream of treatment gas, upon its contact with the stabilised arc of plasma, which can have a very high temperature (for instance $25–30.10^3$ K) is activated by photo-activation and by non-elastic collisions with the high-energy particles of the plasma, in particular with the peripheral electrons, which have a temperature higher than the temperature of the heavy particles (atoms, ions). The generator of the curtain of activated gas is designed in such a manner that the stream of treatment gas $Q_1$, upstream of the stabilised electric arc, reaches the arc tangentially through one or several longitudinal slots, in such a manner as to circumvent the core of the arc which is at a high-temperature and strongly ionised. On the one hand, the treatment gas stabilises the arc and contributes to increasing its temperature, since it contracts the cross-section of the arc through which travels the major portion of the electric current. On the other hand, the treatment gas is activated by convection, by photo-activation and by energy transfer to the particles thereof from peripheral particles of the electric arc of plasma, in particular from high-energy electrons. In this manner, the stream of gas is brought to a metastable state, i.e. of thermodynamic non-equilibrium. This state has a lifetime (relaxation time) which is relatively short. The speed of the stream of gas must be selected in such a manner as to be sufficiently high to make it possible for the stream of activated gas to reach the surface to be treated, without loosing its activation.

Another important characteristic of the invention is that the stream of activated gas is not ionised (i.e. is not electrically conductive). Such a state can be achieved by ensuring that the stream of treatment gas comes in contact substantially only with the peripheral zone of the arc which is poor in charged particles. The presence of electrically charged particles in the curtain of activated gas is to be avoided for two reasons. The first reason is that an electrically charged particle has a high cross-section of effective elastic interaction with neutral particles, which contributes to causing it to loose its activation energy before its contact with the surface to be treated. The second reason is that the electrically charged particles confer an electrical conductivity to the curtain of activated gas with all the undesirable consequences mentioned previously.

Generally speaking, an important condition for the implementation of the present invention is that the time of travel of the particles of the curtain of activated gas from the electric arc to the surface to be treated, be lesser than the relaxation time τ of the activated particles. This leads to the following relation for the speed v of the stream of activated particles:

$$v \geqq L/\tau$$

in which L is the distance of the central axis of the arc from the surface to be treated.

In practice, for distances L amounting to approximately 1 cm and for relaxation times in the order of $10^{-4}$ sec (see L. S. Polak, Cinétique plasmo-chimique, Physique et chimie des plasmas à basse température, Naouka, Moscow 1971, p. 302–380), the conditions are selected so that $v \geqq 100$ m/s. In practice, based on the above-mentioned rules, those skilled in the art will be able to select the speed at which the stream of activated gas must be projected on the surface to be treated in each specific case.

It is to be mentioned that WO 99/46964 discloses that it is possible to create a stream of gas of a low electric conductivity, by separating the zone of contact of the stream of gas with the string of plasma and the treatment zone by a lumen of a variable width. It is stressed that the temperature of the gas which can be achieved, is very close to that of the plasma string, while the electrical conductivity is “eliminated”. This assertion is based on the calculations which were published by Yu Raizer (1987) and which assumed that the gases were in a state of a thermodynamic equilibrium. The resulting stream of gas in this case, is only a stream of hot gas and its action on the surface to be treated will only be a heat treatment, which can be accompanied by a more or less extensive material removal or by the deposition of a film, via a pyrolytic process. Applications of this type in the field of surface treatments are very limited.

An important difference of the present invention with respect to known methods is that the curtain of activated gas is in a metastable state (in a thermodynamic state of non equilibrium) when it comes in contact with the surface. This means that the particles convey to the surface to be treated not only their thermal energy, but and above all, their energy of activation. This makes it possible to induce chemical reactions between the particles of the surface and the activated particles of the curtain of gas in a metastable state, which could not be achieved in the case of a stream of hot gas in a state of thermodynamic equilibrium.

Another substantial difference is that one or several streams of treatment gas, named stream or streams of complementary treatment gas $Q_2$, are made to come in contact with the stream of the treatment gas activated by the arc, with this contact occurring downstream of the arc. The streams of complementary treatment gas are organised in such a manner as to modify the level of the temperature of the curtain of activated gas, and, more importantly, its level of activation and its chemical composition. The stream of complementary treatment gas can be made to come in contact with the flow of activated gas via lateral channels, mostly in the form of longitudinal slots provided in the body of the curtain generating device, or in the form of additional nozzles. A highly effective method for supplying the complementary treatment gas $Q_2$ is to introduce the same via the gap between the surface to be treated and the body of the curtain generating device. This method is very simple and very effective, since the surface to be treated drags the complementary treatment gas by means of the boundary layer. As the surface of the body of the curtain of activated gas runs parallel to the surface to be treated (or to the support surface), the stream of the gas in the slot defined by these surfaces is in state corresponding to Couette’s laminar flow. The speed distribution in the direction, which is perpendicular to the stream, is linear. Advantageously, the amount of complementary treatment gas is adapted and distributed according to the flow rate and to the distance of the surface to be treated from the point of introduction of the complementary treatment gas. In this manner, the composition of the gas in the gap between the surface to be treated and the body of the device is totally controlled. The device for the introduction of the complementary treatment gas is indicated in the figures only by an arrow or arrows $Q_2$.

The treatments aimed at stripping, cleaning, sterilising or depositing films are in this case extremely efficient and offer new possibilities for this technology in specific areas, such as the treatment of semi-conductors, of glass and of polymeric materials. A major advantage of the present invention is that the treatments aimed at stripping, cleaning or depositing films can be carried out at ambient temperature, namely without any significant heating of the surface to be treated, simply by making use of the activation energy of the impinging particles brought to the surface to be treated by the curtain of activated gas.

In the case where an electric arc—and hence a plasma—is generated by a source of direct current, it is advantageous to generate a magnetic field which is perpendicular to the lines of the current of the electric arc of stabilised plasma, for maintaining the plasma by means of the Ampere forces, in the stabilising channel.

Other advantageous aspects of the invention will become apparent from the claims and from the following description of embodiments and examples, taken in conjunction with the figures, in which:

FIG. 1 is a perspective view, simplified, of a device for treating surfaces, according to the invention;

FIGS. 2*a* to 2*h* are cross-sectional views of different embodiments of a device for the treatment of surfaces, according to the invention; and FIGS. 3*a* to 3*d* are also cross-sectional views, simplified, of different embodiments of a device for treating surfaces, according to the invention.

With reference to the figures, a device for carrying out a method for treating a surface 2 to be treated of an object 4 to be treated includes a device 6 for generating a curtain 8 of an activated gas. The device 6 for generating a curtain of activated gas includes a body 10 having a stabilising channel 12 for guiding and stabilising an electric arc of plasma 14, one or several inlet conduits 16 for the treatment gas $Q_1$, in communication with the stabilising channel 12, via a gas manifold 18 and an opening, a passage and an outlet nozzle 20 for the activated gas, in communication with the stabilising channel 12. The body 10 can be formed of juxtaposed stabilising plates or diaphragms 22, made, for example, from a material with a good thermal conductivity, such as a metal provided with an insulating layer to insulate electrically the plates from one another. A cooling system, such as a water circuit (not illustrated), can be provided in the body 10 in order to shield the body from the very high temperature of the electric arc of plasma.

The device further includes a positive electrode 24*a* and a negative electrode 24*b* for generating the electric arc 14, the electrodes being connected to a source of electric power 26. The device 6 can further be provided with an electric field generator 42 (see FIG. 3*c*) for positioning the electric arc. The treatment device can further include a mechanical system for moving the object 4 to be treated relative to the plasma generating device 6 and for thus producing the scanning motion of the curtain 8 of plasma over the surface 2 to be treated (the mechanical system is not illustrated).

The plasma generated by the electric arc 14 initiated between the electrodes 24*a*, 24*b* is stabilised and directed to run parallel to the surface 2 to be treated by the wall of stabilising channel 12 formed by metal plates 22, which are electrically insulated from one another and by a stream of treatment gas $Q_1$, which is directed substantially perpendicularly to the axis of the stabilising channel and, accordingly, perpendicularly to the electric arc. The treatment gas is distributed uniformly over the whole length of the plasma string in such a manner that the stream of the resulting activated gas be directed onto the surface 2 to be treated of the body 4 to be treated, which is mounted on a support 28 which is moved by a translational drive mechanism 30, ensuring the scanning of the surface to be treated by the curtain 8 of activated gas.

A device 32, generating acoustic or ultrasonic waves, is mounted, when desired, on the support, for inducing vibrations of the surface 2 to be treated, which makes it possible to carry out an anisotropic treatment of said surface.

In order to prevent the anodic electrode and the cathodic electrode 24, 24*b* from contaminating the curtain of activated gas with metal vapours, they are positioned with respect to the central axis A of the electric arc of plasma with angles which are different from zero.

The electrodes 24*a*, 24*b* can be housed in sealed pockets (not illustrated), ensuring equal pressures in the anodic and in the cathodic zones, as well as in the zone of the electric arc, in order not to disturb (in a direction perpendicular to the axis A of the arc) the flow of activated gas and not to alter the uniformity of the parameters of the curtain of activated gas. Furthermore, a system of tight seals between the diaphragms comprised of stabilising plates 22 guarantees the absence of gas streams flowing in a direction other than the direction which is perpendicular to the axis A of the electric arc, and this contributes to ensuring the longitudinal uniformity of the curtain of activated gas.

The inlet conduits for the gas or gas mixtures into the device for generating a curtain of activated gas are advantageously carried out via the manifold 18 designed for equalising the static pressure of the gases before and after their passage through the stabilised electric arc 14 and, accordingly, to ensure a uniform distribution of these gases over the whole length of the curtain 8 of activated gas.

Figures 2A, 2B, 2C, 2D, 2E, 2F, 2G, 2H:
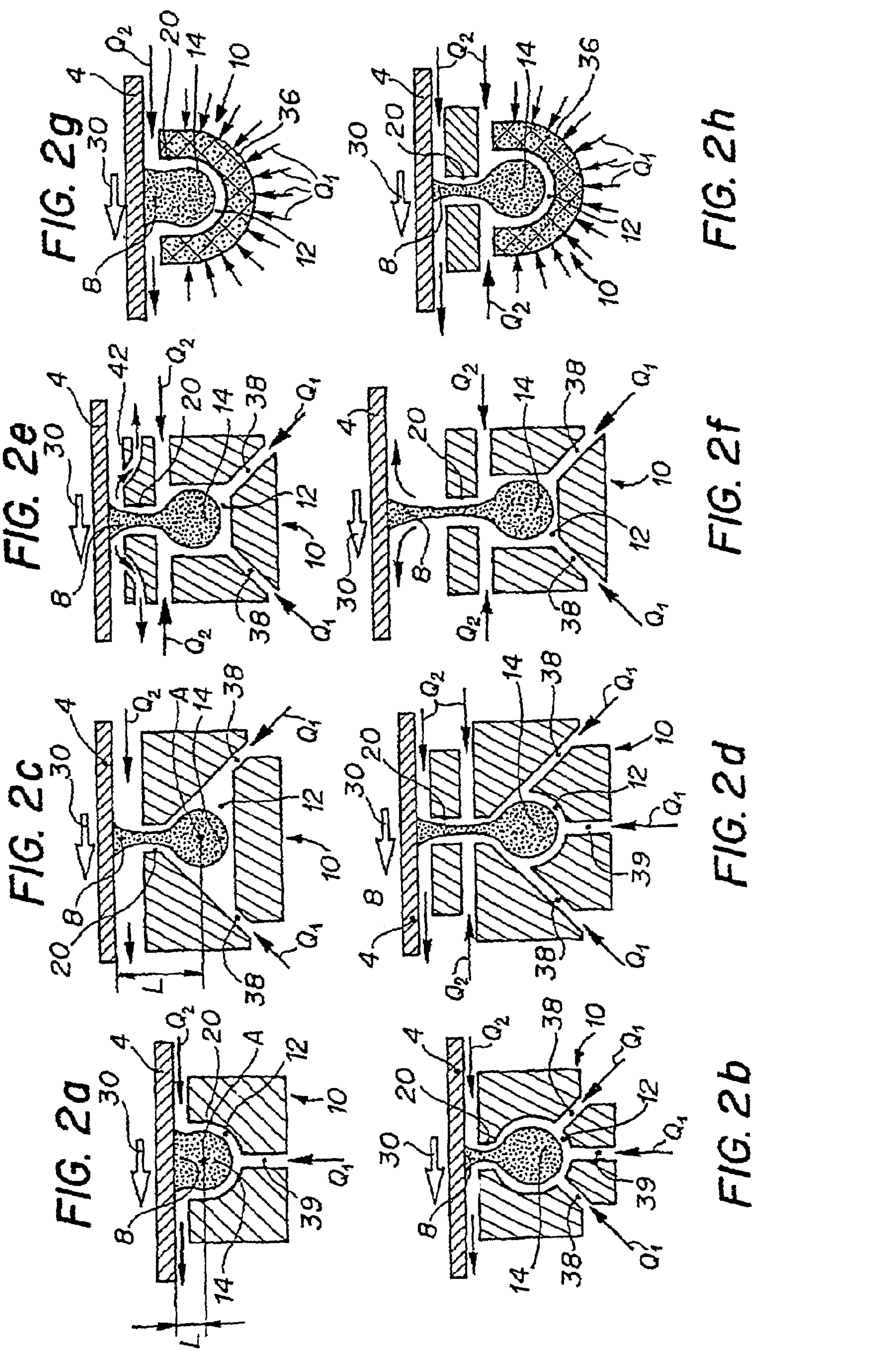

The admission of the treatment gas into the stabilising channel 12 can be achieved either through porous walls 36 such as illustrated in FIGS. 2*g* and 2*h*, or through narrow slots 38 such as illustrated in FIGS. 2*a* to 2*f*. In the embodiments of FIGS. 1 and 2*a*, the supply of the stabilising channel 12 is ensured via an inlet, shaped as a vertical slot, which, in these cases, is centrally positioned, whereas, in the embodiments of FIGS. 2*c*, 2*e* and 2*f*, the supply is ensured through lateral slots 88, i.e. having an angle greater than zero relative to the direction of the stream of the gas of the curtain of activated gas and/or offset from the vertical plane passing through the axis A of the arc and provided on both sides of said vertical plane. The body can be provided with several lateral slots on each side of the arc, which are distributed about the stabilising channel. The lateral slots do not necessarily need to be positioned symmetrically with respect to the stabilising channel, depending on the profile of the channel and of the position of the outlet slot. One can also provide a combination of lateral slots 38 and of a central slot 39, as is shown in FIGS. 2*b* and 2*d*.

All the causes for the occurrence of gradients in the different parameters of the plasma along the axis A of the electric arc of plasma and which generate a non uniformity in the curtain 8 of activated gas and, accordingly, of the treatment, are eliminated in the present invention. This is firstly due to the absence of any flow of gas in a direction non perpendicular to the axis A along the curtain of activated gas, as well as to the use of electrodes 24*a*, 24*b* having axes which do not correspond to the axis A of the electric arc of stabilised plasma in the stabilising channel. Furthermore, in this manner, there is no injection into the stabilising channel of metal vapours generated at the electrodes and these vapours are evacuated by convection.

In the treatment method according to the invention, an electric arc of plasma is initiated between the electrodes 24*a*, 24*b* and is stabilised by the walls of the stabilising channel 12 and a stream of treatment gas $Q_1$. The surface to be treated is mounted on a movable support 28, in order to carry out a scanning motion with respect to the curtain 8 of activated gas. The treatment gas is introduced into the stabilising channel 12 via the lateral inlet slots and/or the central slot 38, 39 or, further, through the pores 36 of the side opposite to the surface to be treated. The gas, when passing partly through the peripheral zone of the electric arc of plasma and partly circumventing the arc, is heated and activated, and it exits in the form of a curtain of activated gas, flowing in the direction of the surface to be treated via the outlet opening or passage 20. The outlet passage 20 can be provided as a slot of a predetermined width. For many applications, the width of the slot is preferably lesser than the diameter of the electric arc of the plasma (14), in order to form a thin curtain of activated gas, of which the parameters can be accurately controlled. A narrow outlet slot also contributes to properly confining and stabilising the electric arc of plasma. The lateral slots 38 for the introduction of the treatment gases $Q_1$ into the stabilising channel 12 are highly advantageous, since they make it possible, on the one hand, to confine the electric arc of plasma and, on the other hand, to control the portion of gas flowing through the peripheral zone of the electric arc of plasma and the proportion of gas circumventing the electric arc, in order to adjust the composition and the density of active particles in the curtain of activated gas. The porous walls for the introduction of the treatment gas abound the arc as illustrated in FIGS. 2_g_ and 2_h_, make is also possible to adjust the parameters of the curtain of activated gas and to confine the electric arc. It is to be noted that the position of the lateral inlet slots 38 for the gas, combined with the profile of the stabilising channel (square, cylindrical, triangular or other), influences the properties and the composition of the curtain of activated gas, the disposition of these elements making it possible to optimise the device for the treatment to be carried out according to, in particular, the type of material of the object to be treated.

During the linear motion of the surface to be treated, relative to the curtain of activated gas, the latter inter-reacts with the surface to be treated and carries out the intended process (sterilisation, activation, stripping, deposition of films, formation of powders, etc.). The treatment to be carried out influences the parameters of the method, such as the contact time, the temperature of the plasma, the speed of the relative motion, the distance of the centre of the electric arc of plasma from the surface to be treated and the composition of the treatment gases. The versatility of the method proposed for generating the plasma and the scope of potential applications can be inferred from the following ranges of the main parameters of the plasma:

| | |
|---|---|
| Temperatures of the plasma | From 10 000 to 30 000 degrees Kelvin. |
| Speed of the plasma | From 10 to 1 000 m/s (up to the speed of sound at the temperature of the plasma). |
| Composition of the plasma | The gas can be inert, oxidising, reducing, chemically active for the synthesis of complex products, of ultra-dispersed powders. |
| Density of the flow of heat | From $10^{-1}$ to $10^2$ $MW/m^2$. |
| Purity of the plasma | Absence of undesirable extraneous material, in particular of metal vapours. |

The parameters listed above vary, depending upon the electric current, the flow rate of the treatment gases, the height of the electric arc, the position of the inlet slots and of the outlet slots for the treatment gases and for the residual gases, the position of the inlet for the treatment gases $Q_1$ and for the complementary gases $Q_1$ and their flow rates. By complementary treatment gases, is meant here gases $Q_2$ used for cooling, in case of need, the stream of activated gas without deactivating the same, for decreasing, in case of need, its electric conductivity, further for changing the chemical composition thereof (introduction of active gases) or for depositing films (introduction of ultra-dispersed powder or of vapours of organic, organo-metallic or inorganic materials).

The adjustment of the treatment parameters is achieved in the device according to the present invention through an appropriate design of the stabilising channel and of the mode of introduction and evacuation of the gases.

The body 10 of the device for generating a curtain is made of a metal with a good electric and thermal conductivity. To avoid short-circuits, it is comprised of diaphragms which are isolated electrically from one another. One can also make the wall of the stabilising channel from a bloc of a material capable of withstanding the high temperatures of the arc. This material can be, for example, a refractory material (ceramic) which is porous and through which is introduced uniformly the treatment gas, which also has the effect of cooling the ceramic, as is illustrated in FIGS. 2_g_ and 2_h_.

The stabilising channel 14 can have a cross-section, which is semi-circular, (FIGS. 2_a_ and 2_g_), circular (FIG. 2_b_), triangular (FIG. 2_c_), square (FIGS. 2_e_ and 2_f_) or combined (FIG. 2_d_). These alternate versions correspond to different methods for manufacturing the body 10 and the stabilising channel 12.

It is important to well select the place of introduction of the treatment gas $Q_1$. An introduction slot from beneath, at the centre of the channel, ensures a good filling of the entire volume of the stabilising channel (FIGS. 2_a_, 2_b_). A lateral introduction (FIG. 2_a_) or a tangential introduction (FIG. 2_d_) makes it possible to weaken the action of the plasma on the vertical walls of the channel.

The complementary treatment gas or the mixture of complementary treatment gases $Q_2$ must be introduced in larger amounts at the beginning of the formation of the curtain of activated gas (FIGS. 2_a_, 2_e_, 2_f_) or also downstream of the flow (FIGS. 2_b_, 2_c_, 2_d_) or directly along the surface to be treated (FIGS. 2_c_, 2_d_, 2_h_).

For certain applications, it is useful to move laterally the outlet channel for the curtain of activated gas, relative to the cylinder of the stabilised arc, so as to form a labyrinth 38, such as the one illustrated in FIG. 3_c_, for the purpose of preventing the ultraviolet rays emitted from the electric arc of plasma from reaching the surface to be treated and of reflecting them backwards by the protruding walls of the labyrinth 40.

It is also useful to provide means enabling the inversion of the operations of the channels for introducing the treatment gas or gaseous mixture and for evacuating the residual gases when carrying out a surface treatment through a to-and-fro scanning motion.

The following examples are given to illustrate the practice of the present invention and facilitate its understanding:

EXAMPLE 1

Treatment of Dielectric Materials

The embodiment used in this example corresponds to that illustrated in FIG. 3_a_. This embodiment enables the surface fusion of large areas of refractory materials, such as bricks size 350×150×30 mm.

The Parameters of the Installation Were:

| | |
|---|---|
| Current of the arc | 150 A |
| Voltage | 280 V |
| Length of the arc | 200 mm |
| Shape of the profile of the stabilising channel | triangular |
| Effective diameter of the cross-section of the stabilising channel | 5 mm |
| Distance L of the axis of the arc from the surface to be treated | 10 mm |

The body of the device, as in all the following examples, includes cooled metal diaphragms, with the thickness of each diagram being 6 mm.

| | |
|---|---|
| Number of cathodes | 1 |
| Number of anodes | 2 |
| Flow rate of the argon, used as the treatment gas | 5 l/min. |
| Scanning speed | 0.6 m/min. |
| Speed v of the activated gas | 100 m/sec |
| Results: | |
| Thickness of the vitrified layer formed | ≈1 mm. |

The method described is a treatment intended for activating a surface. The treatment used is powerful, but involves low hydrodynamic flows, to avoid any sputtering of the material superficially melted. In this case, the width of the curtain of the activated gas at the location of the treatment is 5 mm. The uniformity of the treatment over the full length of the material is of ±10% and is determined by the manufacturing parameters of the refractory material and by initial porosity.

In a known method for the treatment of building materials with a plasma, the material is treated by a free arc (non stabilised) urged against the surface to be treated by a magnetic field, the arc being in contact with the surface to be treated. In the case of the present invention, the surface to be treated is not directly in contact with the electric arc, but with the curtain of activated gas. The quality of the treatment and the uniformity achieved are superior in the case of the present invention, owing to the exclusion of the axial streams of heat of a convective nature, the helicoidal instabilities of the arc and the transport of matter along the arc, which are all conducive to the redeposition of residual products and, accordingly, to variations in the properties of the surface treated, along the direction of the arc.

EXAMPLE 2

Treatment of Electrically Conductive Materials

Figures 3A, 3B, 3C, 3D:
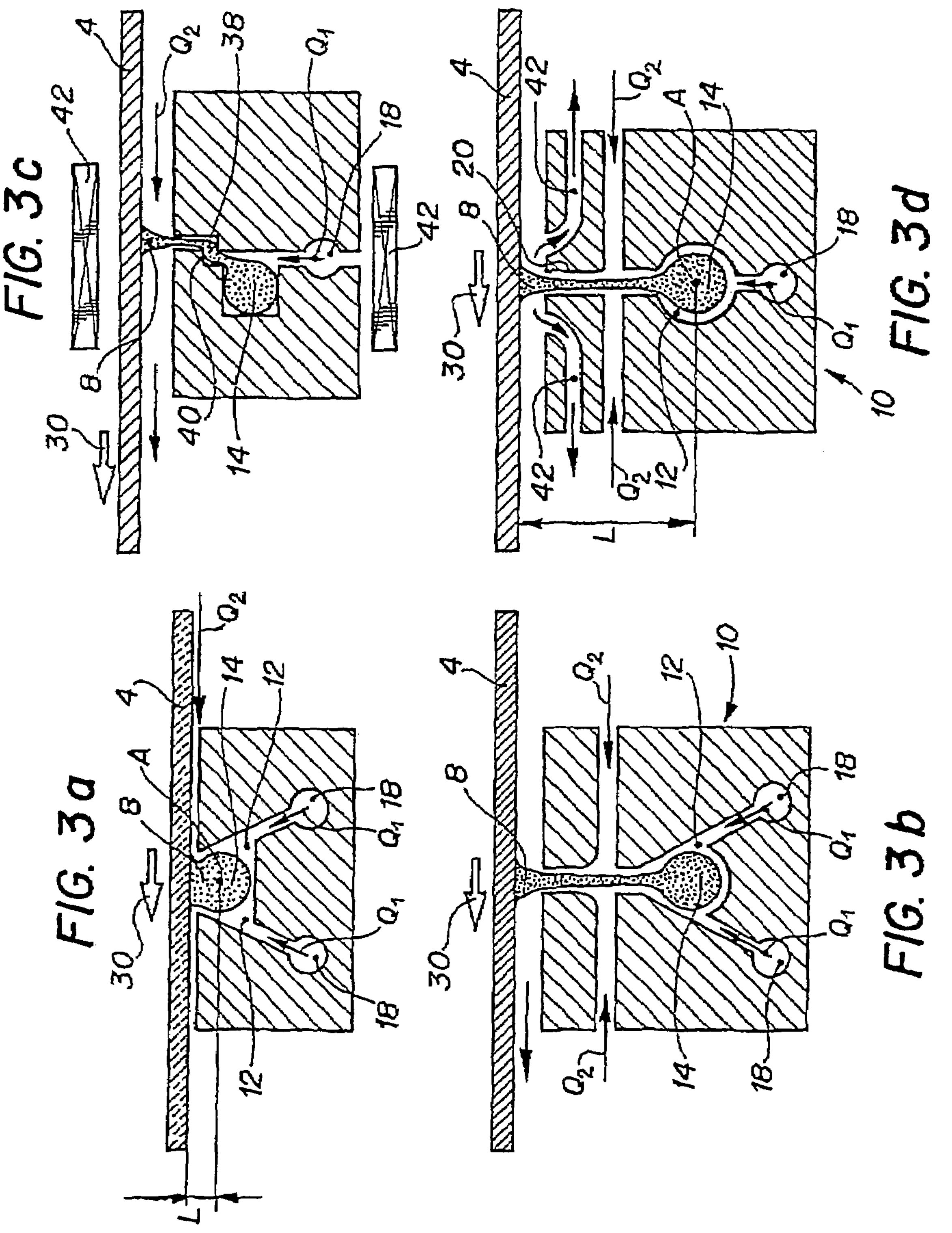

The basic design of the device used is shown in FIG. 3*b*. This embodiment is used for depositing dielectric layers on a roll of an aluminium sheet having a width of 120 mm and a thickness of 0.1 mm.

The Parameters of the Device Were as Follows:

| | |
|---|---|
| Current of the arc | 150 A |
| Voltage | 3.5 V |
| Length of the discharge | 200 mm |
| Shape of the cross-section of the stabilising channel | triangular |
| Width of the outlet slot for the curtain of activated gas | 2 mm |
| Number of cathodes | 1 |
| Number of anodes | 1 |
| Flow rate of the treatment gas $Q_1$ (Ar) | ≈6 l/min. |
| Flow rate of the complementary treatment gas $Q_2$ (a gaseous mixture of argon, oxygen and hexamethyldisilasane) | ≈12.7 l/min. |
| Scanning speed (winding up speed of the roll) | 1.9 m/sec |
| Distance L of the axis of the arc from the surface to be treated | 8 mm |
| Speed v of the activated gas | 300 m/sec |
| Results | |
| Thickness of the layer of silicon oxide formed | 500 Å |
| Uniformity of the thickness of the deposit | 95% |

In this case, a film ($SiO_2$) is deposited from a stabilised arc of a plasma at a high temperature and at ambient pressure, in a continuous manner and over a large conductive surface. The argon, which is a component of the treatment gas, is used as a carrier for small amounts of reactive gases such as oxygen and gaseous hexamethyldisilasane, for slowing down (if not preventing altogether) the bulk formation of $SiO_2$ powder and for cooling the plasma, without loosing the excitation energy of the molecules and of the radicals, to temperatures in the vicinity of 3–4 $10^3$ K, at which the plasma has an electrical conductivity sufficiently low to eliminate any risk of a court-circuit between the electric arc and the metal treated.

The result of this application is that a uniform passivating layer of silicon oxide $SiO_2$ is obtained, having a thickness of 0.05 μm, on the surface of the aluminium sheets. This layer exhibits an excellent adhesion, it is resistant to moisture and to corrosion and has good dielectric properties. It replaces advantageously the lacquer layers which are conventionally used and which lack solidity, are sensitive to moisture and have poor dielectric properties.

EXAMPLE 3

Treatment of Organic Products

FIG. 3*c* shows schematically the device used for treating cloths made of organic fibres (for example of polyester). The purpose of the treatment is to modify the structure of the fibres and to activate the hydrophilic (or hydrophobic) functions over the entire surface of the cloth at speeds acceptable by the textile industry for the mass-production of such products.

In this case, the outlet slot 38' is designed as a labyrinth, to prevent any irradiation of the surface to be treated by the ultraviolet rays produced by the discharge, since it is known that ultraviolet rays reduce the solidity of synthetic materials and modify their colour. The body of the device is comprised of two halves.

The Parameters Were as Follows:

| | |
|---|---|
| Current | 100 A |
| Voltage | 370 V |
| Flow rate of the treatment gas (Ar 7 + 2% oxygen) | 108 l/min. |
| Effective diameter of the channel | 5 mm |
| Width of the outlet slot for the curtain of activated gas | 1 mm |
| Width of the sheet of cloth treated | 200 mm |
| Scanning speed of the cloth | 31 m/sec |
| Distance L of the axis of the arc from the surface to be treated | 12 mm |
| Speed v of the activated gas | 400 m/sec |

A magnetic field of 0.2 Tesla was applied so as to maintain the arc at the desired distance L from the surface of the cloth to be treated.

| Results: | |
|---|---|
| Uniformity of the treatment (namely, of the parameter "wetting angle"): | 99%. |

The result of the treatment is an activation of the surface and a substantial increase in its hydrophilic properties.

By introducing certain chemical components into the zone of contact of the curtain of activated gas with the surface to be treated in the form of a stream of complementary treatment gas $Q_2$ such as, for example $C_3F_6$, a cloth was obtained which was substantially hydrophobic (wetting angle of about 170° C.) and which was resistant to washing. In this example, the gas $C_3F_6$ was introduced upstream of the line of contact of the activated curtain with the cloth, via a longitudinal slot between the body 10 of the device generating the curtain and the cloth.

EXAMPLE 4

Treatment of Semi-Conductive Materials

The FIGS. 1 and 3 illustrate schematically a device for stripping from silicon wafers the photoresist used in photolithographic processes, in the electronics industry. The silicon wafers tested had a diameter of 200 mm. The thickness of the photoresist layer was 0.3 μm.

The parameters of the device were as follows:

| | |
|---|---|
| Current | 120 A |
| Voltage | 320 V |
| Flow rate of the treatment gas $Q_1$ (Ar) | 6 l/min. |
| Flow rate of the complementary treatment gas $Q_2$ (90% of Ar, $O_2$, $N_2$, $H_2$and $CF_4$) introduced along the surface to be treated | 10 l/min. |
| Effective diameter of the stabilising channel | 5 mm |
| Width of the outlet slot for the curtain of activated gas | 2 mm |
| Height of the outlet slot for the curtain of activated gas (this prevents short-circuits from occurring between the plasma and the silicon wafer during the stripping) | 8 mm |
| Scanning speed of the silicon wafer | 0.3 m/sec |
| Distance L of the axis of the arc from the surface to be treated | 12 mm |
| Speed v of the activated gas | 180 m/sec |
| Duration of the cleaning of one wafer (which corresponds to a productivity of more than 1000 wafers per hour). | 3 sec |
| Results: | |
| Uniformity of the treatment (based on electro-physical characteristics) | 99.9% |

These Tests Demonstrate That:

- One can strip a photoresist, whatever its degree of curing.
- There is no redeposition of residual products.
- One can carry out the stripping of the photoresist after high doses of ionic implantation.
- The phenomenon of residual stains or spots is eliminated.
- One can carry out the removal of post-stripping residues (post-etch residuals; post-metal, post-poly, etc.).
- The electro-physical characteristics of the structures are not altered in any way.

EXAMPLE 5

Stripping Treatment of Semi-Conductors

FIGS. 1 and 3*d* illustrate schematically a device for stripping of silicon dioxide from silicon wafers through photoresist masks. This operation is used in photolithographic processes in the electronics industry.

The silicon wafers treated had a diameter of 200 mm. The wafer was fastened to a support subjected to the action of an ultrasonic generator in such a manner that the vibrations of the surface to be treated propagate in the direction perpendicular to the surface of the silicon wafer.

The distance of the masks from the photoresist was of 0.1 μm.

The parameters were:

| | |
|---|---|
| Current | 120 A |
| Voltage | 320 V |
| Flow rate of the carrier gas Ar | 6 l/min. |
| Flow rate of the treatment gas: $CF_4$ + 90% Ar | 10 l/min |
| Diameter of the stabilising channel | 5 mm |
| Width of the outlet slot (for the curtain of activated gas) | 2 mm |
| Height of the outlet slot | 8 mm |
| Scanning speed of the outlet slot | 0.3 m/sec |
| Duration of the stripping | 10 sec |
| Frequency of the ultrasounds | 42 kHz |
| Energy of the ultrasounds | 5 kW |
| Distance L of the axis of the arc from the surface to be treated | 12 mm |
| Speed v of the activated gas | 110 m/sec |
| Results: | |
| Uniformity of the treatment (of the physical characteristics) | 99.7% |
| Degree of anisotropy of the stripping | 100 |

Grooves were obtained having walls which were substantially vertical, of a depth of 1 μm and a width of 0.1 μm. This result is of considerable interest for applications in electronics, since, for example, the stripping with conventional plasma systems operating under vacuum produces a degree of anisotropy lesser than 30, i.e. considerably lower than that achieved by the method of the invention.

EXAMPLE 6

Manufacture of $SiO_2$ Powders

The method and the devices claimed can be used for the manufacture of powders and, in particular, of submicronic and nanometric powders.

In this case, the uniform distribution of the parameters of the curtain of activated gas makes it possible to achieve an identical formation of clusters and of powders at different locations of the curtain and to achieve, accordingly, a good selectivity for the production of a powder with a minimal dispersion of its particle size, of the dimensions of the grains and of their properties.

For example, a curtain of activated gas was used, which was comprised of argon and of nitrogen (Ar 20%, N 80%). A stream of complementary treatment gas $Q_2$ containing gaseous hexamethyldisilasane (Ar 90%, HDMS 10%) was introduced upstream of the contact zone of the curtain of activated gas with the support surface, via a slot running parallel to the axis A of the arc. The other conditions of formation of the curtain were those of examples 4 and 5.

Polycrystalline powders of $SiO_2$, having a particle size of 100 nm±10%, were formed on a support provided as a belt conveyor, uniformly over a width of 20 cm.

In all the examples given above, the impinging activated gas, which functions as the reactive agent, is thermodynamically in a state of non equilibrium, because the condition $v>L/\tau$ is fulfilled. In fact, the values L/v in all the examples are equal to about $10^{-4}$ sec or less, these values corresponding to characteristic relaxation times of the particles in an activated state in the curtain of gas, and accordingly, the activated particles in these examples are in a metastable state. This state must be retained inside the boundary layer which separates the impinging gas from the surface to be treated. To this end, the diffusion length D of the activated molecules, radicals and atoms, contained in the stream of activated gas during their passage through the boundary layer between the impinging stream and the surface treated must be greater than the thickness δ of the boundary layer, as demonstrated by the following considerations.

Since the activated gases are not substantially in a ionised state, the Lewis, Prandtl and Schmidt numbers have a value in the order of one and the thickness of the boundary layer remains substantially identical from the standpoint of its thermal conductivity, diffusion and viscosity characteristics. One can estimate the thickness of the boundary layer from the values of the thermal density q, which according to the measurements made in the case of the examples given, exceeds $10^7$ W/mm$^{2.}$ The thermal conductivity coefficient λ of the activated gases at ambient pressure and for a temperature of the impinging stream of $\approx 10^4$ K, is in the order of 1 W/m.degree.

The thickness of the boundary layer, according to Fourier's law is: $\delta \approx \lambda/q \leqq 10^{-3}$. The diffusion length D is estimated at $D \approx 1/nQ \leqq 10^{-2}$ m, where n is the density of the active particles of the impinging stream and amounts to $10^{23}$ $m^{-3}$ and Q is the effective cross-section of non-elastic interactions (i.e. of deactivating interactions). The latter is less than $10^{-23} m^2$ for most molecules and radicals and even for excited atoms (see L. S. Polak, Physique et chimie des plasmas a basse temperature, Naouka, Moscow 1971, p. 344).

In all cases, the relation $D > \delta$, which defines the conditions for an absence of a thermodynamic equilibrium, is effectively satisfied, which means that the activated particles, formed in the curtain of activated gas, retain substantially their activation energy during their diffusion through the boundary layer, which separates the impinging stream from the surface to be treated. Accordingly, all this activation energy is used when the activated particles come in contact with the surface to be treated, which makes the reaction efficient.

All these results prove that the present invention makes it possible to obtain outstanding results, substantially better than those achieved with conventional methods and, in particular, those using plasmas under vacuum or plasmas at ambient pressure, but in a state of a thermodynamic equilibrium. This is due to the synergy of plasmo-chemical, hydrodynamic and electromagnetic effects with the high intensity of the interactions ensured by the curtain of metastable activated gas at ambient pressure, as implemented in the present invention.

The invention claimed is:

1. A method for the treatment of surfaces or for the formation of powders on a surface includes initiating an electric arc of stabilised plasma, generating a jet of activated gas in the form of a curtain from said electric arc substantially perpendicularly to the axis A of said electric arc and projecting the curtain of activated gas on the surface to be treated, wherein the distance L of the axis A of the electric arc from the surface to be treated, as well as the speed v of the stream of activated gas are adjusted in such a manner that the particles of the curtain of activated gas be electrically neutral and in a metastable state at the moment contact with the surface to be treated.

2. A treatment method according to claim 1, wherein the distance L of the electrical axis from the surface to be treated and the speed v of the stream of activated gas are adjusted in such a manner as to satisfy the relation $L/v < \tau$, in which τ is the relaxation time of the activated metastable states of the particles of the curtain.

3. A method according to claim 1, wherein the parameters of the stream of activated gas and of the scanning speed of the surface to be treated are adjusted with respect to the stabilised electric arc, in such a manner that the diffusion length D of the activated molecules, radicals and atoms contained in the curtain of activated gas be greater than the thickness δ of the boundary layer separating the impinging activated gas from the surface to be treated.

4. A method according to claim 1, wherein the curtain of activated gas is generated at ambient pressure.

5. A method according to claim 1, wherein a relative scanning motion is produced between the curtain of activated gas and the surface to be treated, in a direction which is substantially perpendicular to the central axis A of the electric arc of plasma.

6. A method according to claim 1, wherein a stream of treatment gas $Q_1$ is introduced upstream of the electric arc of plasma.

7. A method according to claim 6, wherein a stream of complementary treatment gas $Q_2$ is injected into the curtain of activated gas downstream of the electric arc of plasma.

8. A method according to claim 7, wherein the stream of complementary treatment gas $Q_2$ is blown onto the surface to be treated in such a manner that, in the zone of contact of the curtain of activated gas with the surface to be treated, the boundary layer thereof be supplied by said complementary treatment gas.

9. A method according to claim 1, wherein the surface to be treated is subjected to an undulatory motion, in particular through the application of acoustic or of ultrasonic vibrations, for the purpose of accelerating the treatment and/or of conferring an anisotropic character thereto.

10. A method according to claim 1, wherein streams of reactive gases are injected into a treatment zone in the curtain of activated gas, in order to form, by contact with the curtain of activated gas, powders having a composition, a particle size distribution and dimensions which are controlled via the parameters of both the streams of gas supplied to the curtain of activated gas and the complementary treatment gas $Q_2$.

11. A device for carrying out the method according to claim 1, including electrodes (24*a*, 24*b*) for initiating a stabilised electrical arc of plasma (14), a stabilising channel (12) in a body (10) to confine the electric arc of stabilised plasma, conduits (38, 39) in the body for the introduction, uniformly distributed along said arc, of a treatment gas $Q_1$, upstream of said arc and in a direction substantially perpendicular to the axis A of said arc, so as to form a curtain (8) of an activated gas, means for introducing a complementary treatment gas $Q_2$ downstream of said electric arc and a support (28) for holding the object or the material to be treated and for positioning the surface to be treated of said object or material with respect to the body (10).

12. A device according to claim 11, wherein the conduits for the introduction of the treatment gas $Q_1$ include lateral slots (38) for the introduction of the treatment gas $Q_1$ into the stabilising channel (12) at an angle greater than zero, relative to the direction of the stream of the gas of the curtain of activated gas.

13. A device according to claim 11, wherein the distance of the support from the body is adjustable, which makes it possible to define and control the parameters of the boundary layer on the surface to be treated.

14. A device according to claim 11, wherein the means for introducing the complementary treatment gas $Q_2$ include a slot in the body (10), located downstream of the stabilising channel.

15. A device according to claim 11, wherein the stabilising channel has a profile which is substantially cylindrical.

16. A device according to claim 11, wherein the stabilising channel has a profile which is substantially square or rectangular.

17. A device according to claim 11, wherein the stabilising channel has a profile which is substantially triangular.

18. A device according to claim 11, wherein the body of the device for generating a curtain of activated gas includes an outlet passage (20) for the curtain of activated gas, having the shape of a slot of a width lesser than the diameter of the electric arc of plasma (14).

19. A device according to claim 11, wherein the outlet passage for the curtain of activated gas includes a labyrinth portion, arranged so that the ultraviolet rays produced from the arc be unable to reach the surface to be treated.

20. A device according to claim 11, wherein the support of the object to be treated is fixed to a mechanism enabling a relative motion of the surface to be treated with respect to the curtain of activated gas, in a direction perpendicular to the curtain of activated gas, in order to scan the surface to be treated by the curtain of activated gas.

21. A device according to claim 11, wherein it includes means for inverting the operations of the conduits for the stream of complementary treatment gas and for the stream of residual gases, according to the direction of the relative motion of the surface to be treated and of the curtain of activated gas.

22. A device according to claim 11, wherein it includes a source of acoustic or ultrasonic vibrations.

23. A device according to claim 11, wherein the stabilising channel 12 confining the electric arc of plasma is made from a dielectric material which is porous and refractory.

24. A device according to claim 11, wherein the stabilising channel is made from a metal which is sectioned along the axis of the electric arc of plasma into diaphragms which are electrically insulated from one another.

25. A device according to claim 11 for the formation of a powder, wherein the support of the surface to be treated is provided in the form of a conveyor, to carry away the powder generated from the contact of the curtain of activated gas with the surface of the conveyor, acting as the surface to be treated.

* * * * *